United States Patent
Hsu

(10) Patent No.: US 6,348,857 B1
(45) Date of Patent: Feb. 19, 2002

(54) WARNING DEVICE FOR DOOR LOCK OF CAR

(76) Inventor: Tzu-Lung Hsu, P.O. Box No. 6-57, Chung-Ho City Taipei Hsien 235 (TW)

( * ) Notice: Subject to any disclaimer, the term of this patent is extended or adjusted under 35 U.S.C. 154(b) by 0 days.

(21) Appl. No.: 09/652,668

(22) Filed: Aug. 31, 2000

(51) Int. Cl.[7] ............................................... B60R 25/10
(52) U.S. Cl. ........................ 340/426; 340/438; 340/541; 340/542; 340/543; 340/545.1; 70/237; 70/239
(58) Field of Search ............................... 340/426, 438, 340/541, 542, 543, 545.1, 545.2, 547, 429; 70/57.1, 91, 187, 237, 239, 333 R

(56) References Cited

U.S. PATENT DOCUMENTS

| | | | | |
|---|---|---|---|---|
| 3,924,427 A | * | 12/1975 | San Juaquin | 70/264 |
| 4,364,249 A | * | 12/1982 | Kleefeldt | 70/264 |
| 4,737,762 A | * | 4/1988 | Ohnishi | 340/426 |
| 4,799,719 A | * | 1/1989 | Wood | 292/144 |
| 5,534,846 A | * | 7/1996 | Kuroda | 340/426 |
| 5,708,409 A | * | 1/1998 | Schwimmer et al. | 340/426 |
| 5,715,712 A | * | 2/1998 | West | 70/257 |
| 5,771,995 A | * | 6/1998 | Cooney et al. | 187/357 |
| 5,887,466 A | * | 3/1999 | Yoshizawa | 70/257 |

* cited by examiner

*Primary Examiner*—Daniel J. Wu
*Assistant Examiner*—Toan Pham
(74) *Attorney, Agent, or Firm*—Troxell Law Office PLLC

(57) ABSTRACT

A warning device for door lock of car. The door lock has a driving motor to drive a driven shaft to lock the door of the car, and a locking shaft passing through a through hole on the driven shaft. The warning device for door lock of car is characterized in that the through hole is lengthened to form a triggering space and a sensor is provided within the triggering space. When the puller is pulled by external force, the sensor arranged within the triggering space generates a signal to a controlling IC and the controlling IC triggers a driving circuit. The driving circuit drives a loud speaker to alarm the car owner.

5 Claims, 6 Drawing Sheets

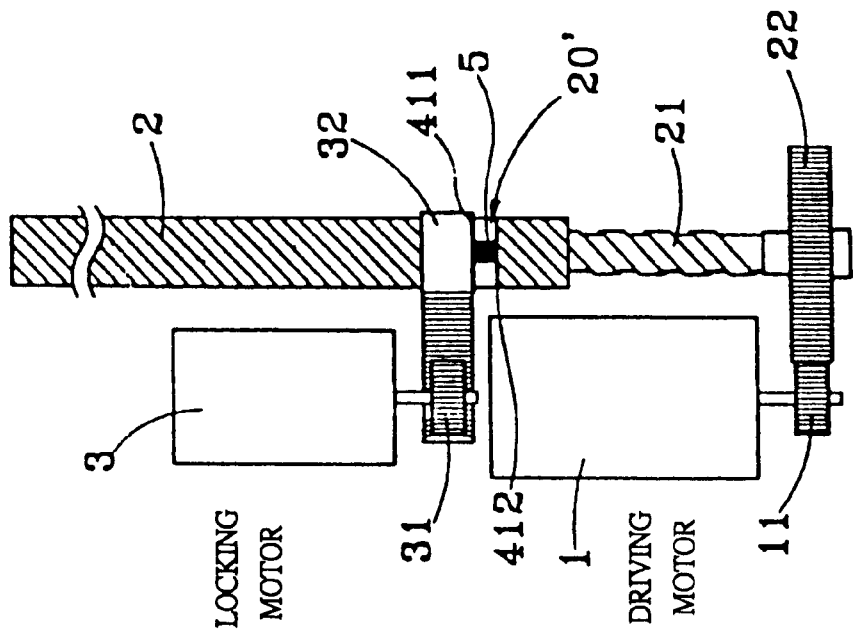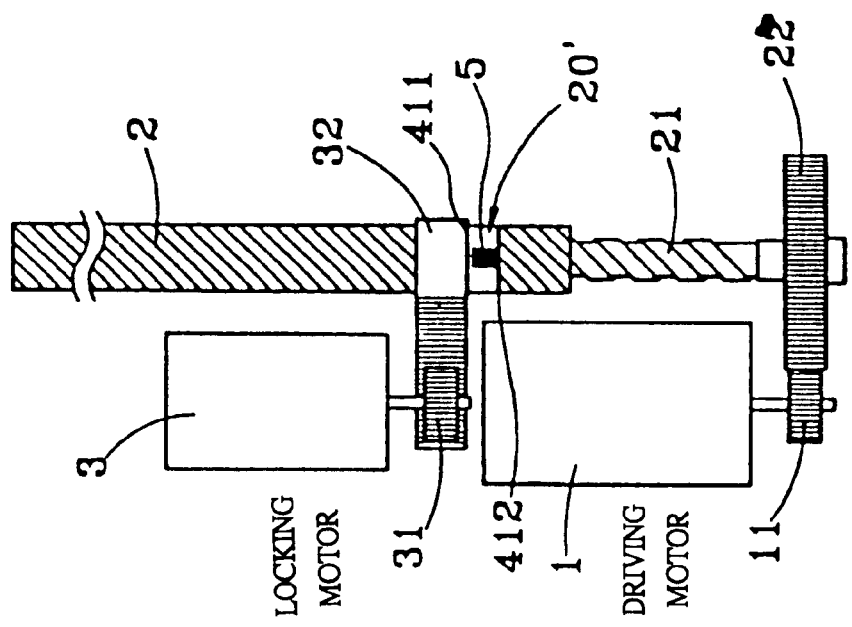

WARNING DEVICE FOR DOOR LOCK OF CAR

BACKGROUND OF THE INVENTION

1. Field of the Invention

The present invention relates to a warning device for door lock of car, especially to a warning device for central controlling door lock of car to provide active protection.

2. Background of the Invention

It is important issue for car manufacturer to investigate burglarproof system arranged in car to protect the car. However, once the car door is opened, the burglarproof system is failed.

Therefore, a central controlling door lock of car is developed to lock four locks of the car doors automatically in one time. The motor of the central controlling door lock first drives driving wheel, which links driven wheel to rotate. The worm of the driven wheel pulls down a driven shaft. At this time, a locking wheel locked on a front end of the motor drives a locking shaft to enter a through hole on the driven shaft. Therefore, a puller between the car door and the driven shaft cannot be pulled and the car door cannot be opened. However, in this situation, the car owner does not know whether the puller of his car had been pulled.

SUMMARY OF THE INVENTION

It is the object of the invention to provide an improved warning device for a door lock of car.

To achieve the above object, the warning device for door lock of car is characterized in that the through hole is lengthened to form a triggering space and a sensor is provided within the triggering space. When the puller is pulled by external force, the sensor arranged within the triggering space generates a signal to a controlling IC and the controlling IC triggers a driving circuit. The driving circuit drives a loud speaker to alarm the car owner.

The various objects and advantages of the present invention will be more readily understood from the following detailed description when read in conjunction with the appended drawing, in which:

BRIEF DESCRIPTION OF THE DRAWINGS

FIGS. 3A and 3B show section views of the warning device according to a preferred embodiment.

DETAILED DESCRIPTION OF THE PREFERRED EMBODIMENTS

Figure 1:
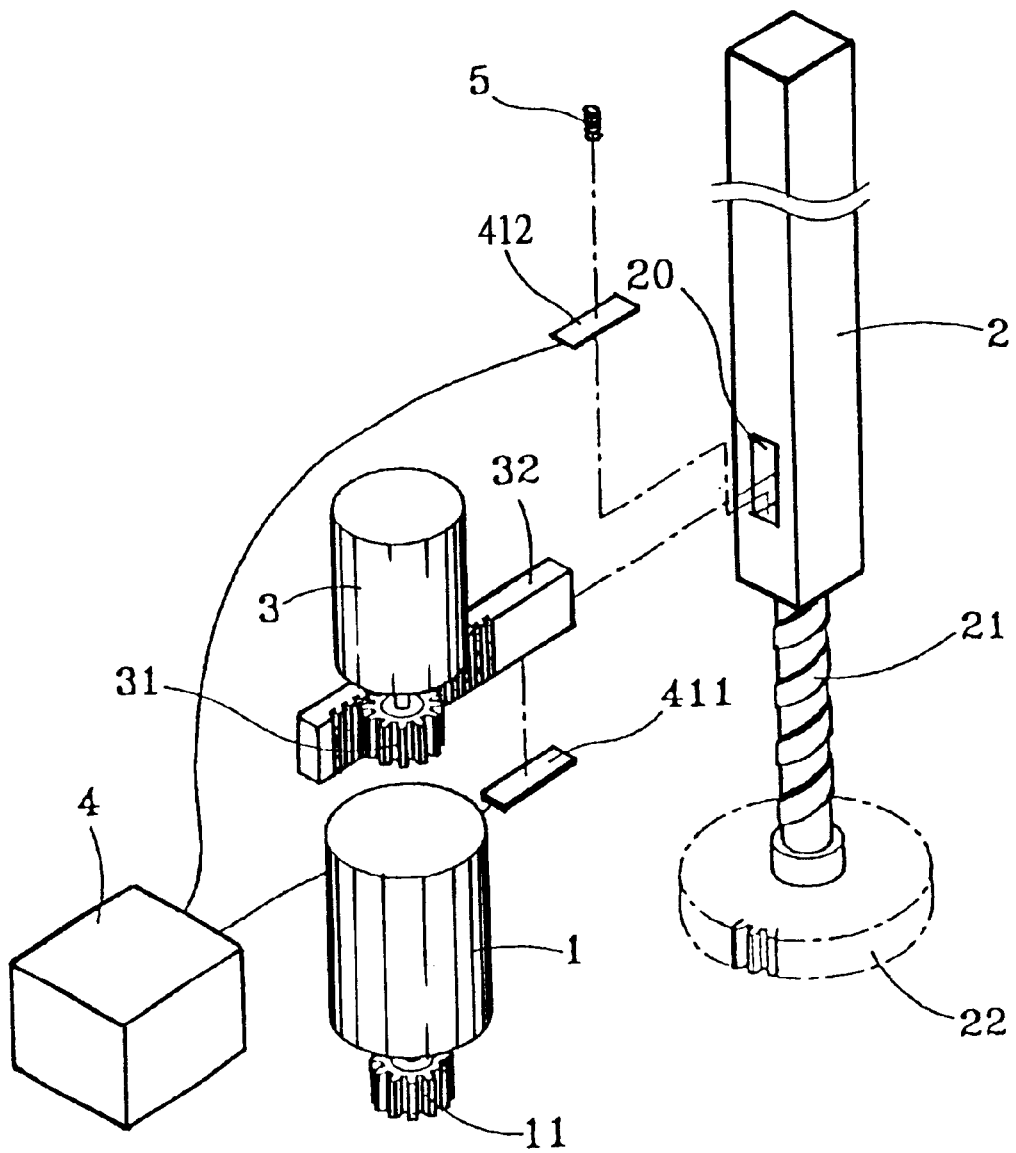
FIG. 1 shows an exploded view of a preferred embodiment.
Figure 2:
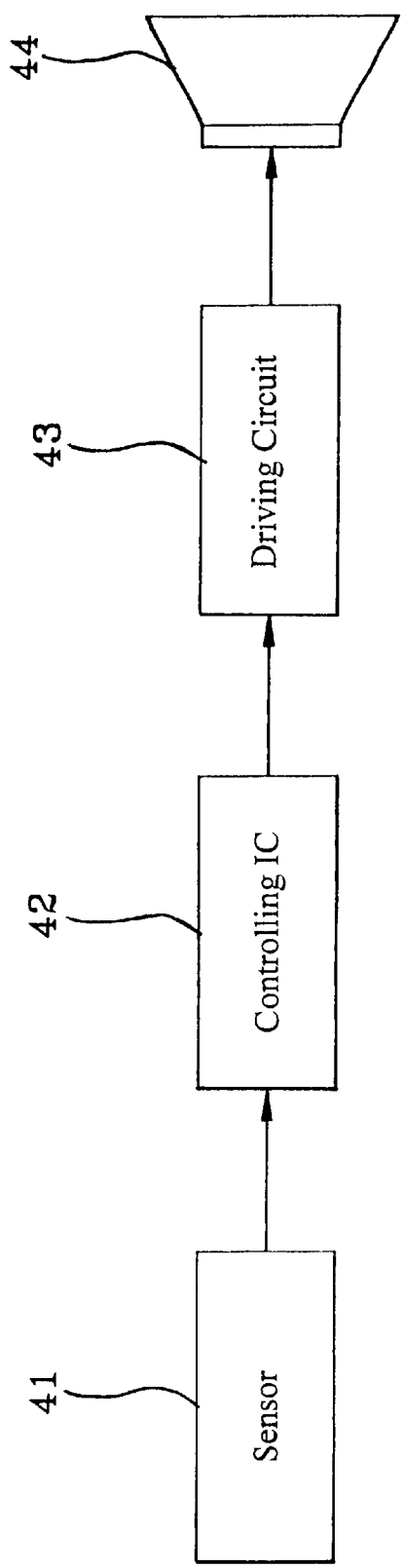
FIG. 2 shows the block diagram of the warning device.

With reference now to FIGS. 1 to 3, the warning device for door lock of car according to the present invention is provided at the central controlling door lock of the car. The conventional central controlling door lock of the car has the following operations. When the central controlling door lock is triggered, the driving motor 1 drives a driving gear 11, which links a driven gear 22 to rotate. At this time, a worm 21 on the driven gear 22 drives a driven shaft 2 downward. Moreover, a locking gear 31 at one side of a locking motor 3 drives a locking shaft 32 to enter a through hole 20 in the driven shaft 2 such that a puller (not shown) of the car door and linked to the driven shaft 2 cannot be pulled. However, the car owner does not know whether the puller of his car had been pulled, i.e., someone had intended to steal his car.

According to this invention, the space of the through hole 20 of the driven shaft 2 is lengthened to form a triggering space 20'. The triggering space 20' is formed between bottom of the locking shaft 32 and bottom of the through hole 20. A sensor 41 is provided within the triggering space 20'. When the puller is pulled by external force, the sensor 41 arranged within the triggering space 20' generates a signal to a controlling IC 42 and the controlling IC 42 triggers a driving circuit 43. The driving circuit 43 drives a loud speaker 44 to alarm the car owner.

In a preferred embodiment of the present invention, the sensor 41 comprises two metal plates 411 and 412. The metal plate 411 is arranged on bottom of the locking shaft 32 and the metal plate 412 is arranged on bottom of the triggering space 20' and has a returning element 5. When the driven shaft 2 is moved by a force acting on the puller the returning element 5 is in contact with the metal plate 411 arranged on bottom of the locking shaft 32. Therefore, a signal is sent to the controlling IC 42 and the controlling IC 42 triggers a driving circuit 43. The driving circuit 43 drives a loud speaker 44 to alarm the car owner. When the driven shaft 2 is not longer moved by the puller, the driven shaft 2 returns to original position due to the returning force of the returning element 5.

Figure 4:
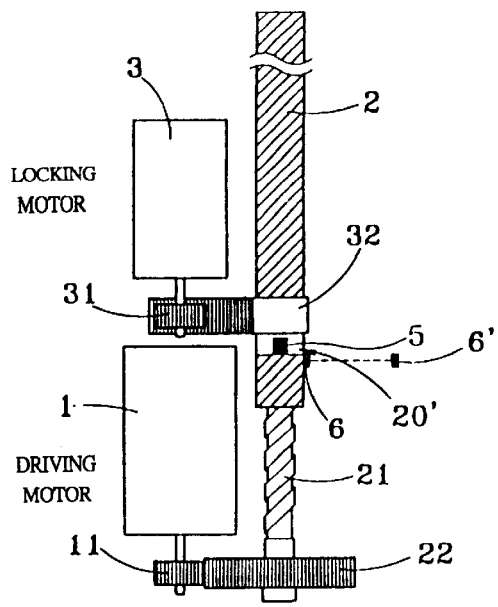
FIG. 4 shows another preferred embodiment.
Figure 5:
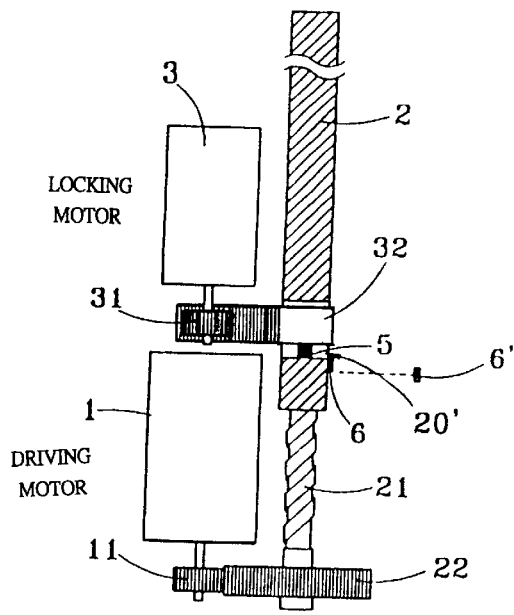
FIG. 5 is a sectional view of warning device in FIG. 4.

FIGS. 4 and 5 show another preferred embodiment of the present invention, the sensor 41 comprises two optoelectronic elements 6 and 6' arranged outside the driven shaft 2. When one optoelectronic element 6 is moved with the driven shaft 2 light emitted from the optoelectronic element 6 is no longer received by another optoelectronic element 6'. Therefore, a signal is sent to the controlling IC 42 and the controlling IC 42 triggers a driving circuit 43. The driving circuit 43 drives a loud speaker 44 to alarm the car owner. When the driven shaft 2 is not longer moved by the puller, the driven shaft 2 returns to original position due to the returning force of the returning element 5. Moreover, the sensor 41 can also comprise two magnetic elements 6 and 6'.

Figure 6:
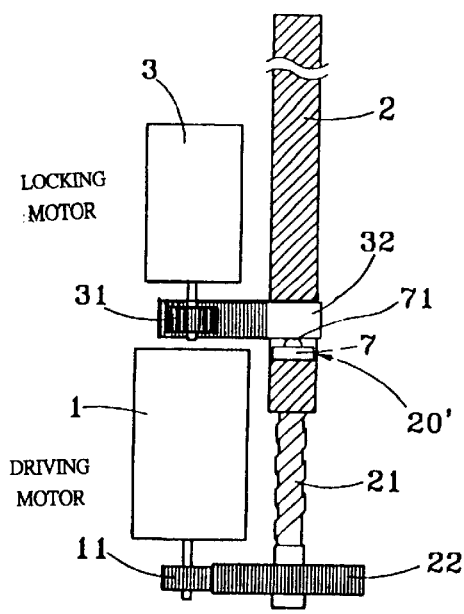
FIG. 6 shows still another preferred embodiment.
Figure 7:
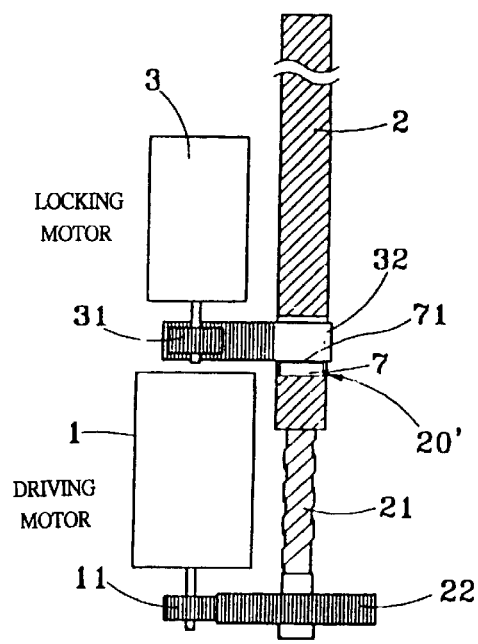
FIG. 7 is a sectional view of warning device in FIG. 6.

FIGS. 6 and 7 show another preferred embodiment of the present invention, the sensor 41 is a micro-actuated switch 7 arranged outside the driven shaft 2 and the button 71 of the micro-actuated switch 7 is extended to the triggering space 20'. When the driven shaft 2 is moved, the button 71 is pressed and the micro-actuated switch 7 generates a signal to he controlling IC 42 and the controlling IC 42 triggers a driving circuit 43. The driving circuit 43 drives a loud speaker 44 to alarm the car owner. When the driven shaft 2 is not longer moved by the puller, the driven shaft 2 returns to original position due to the returning force of the returning element 5.

Figure 8:
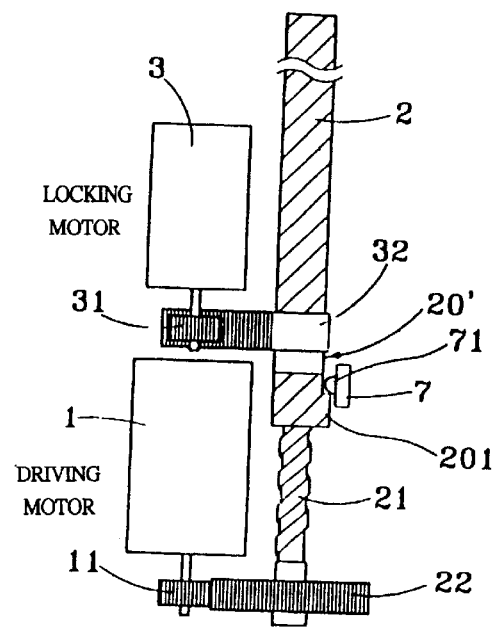
FIG. 8 shows still another preferred embodiment.

FIG. 8 shows another preferred embodiment of the present invention, the micro-actuated switch 7 arranged outside the driven shaft 2 and atop a bump 201 on lower part of the driven shaft 2. When the driven shaft 2 is moved by external force. The bump 201 touches the button 71 of the micro-actuated switch 7 and the micro-actuated switch 7 generates an alarm signal.

Figure 9:
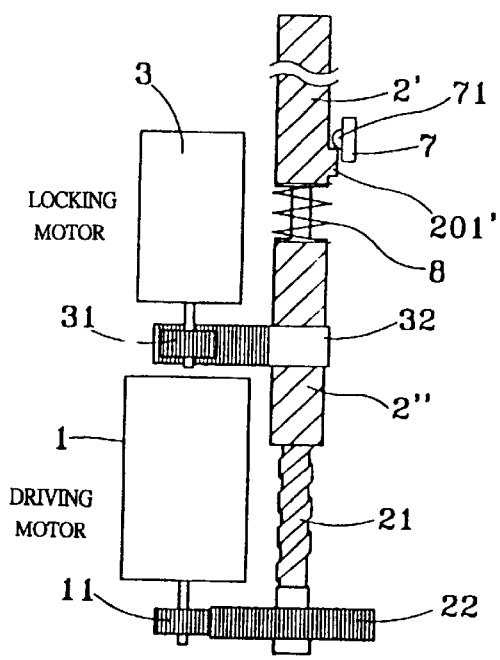
FIG. 9 shows still another preferred embodiment.
Figure 10:
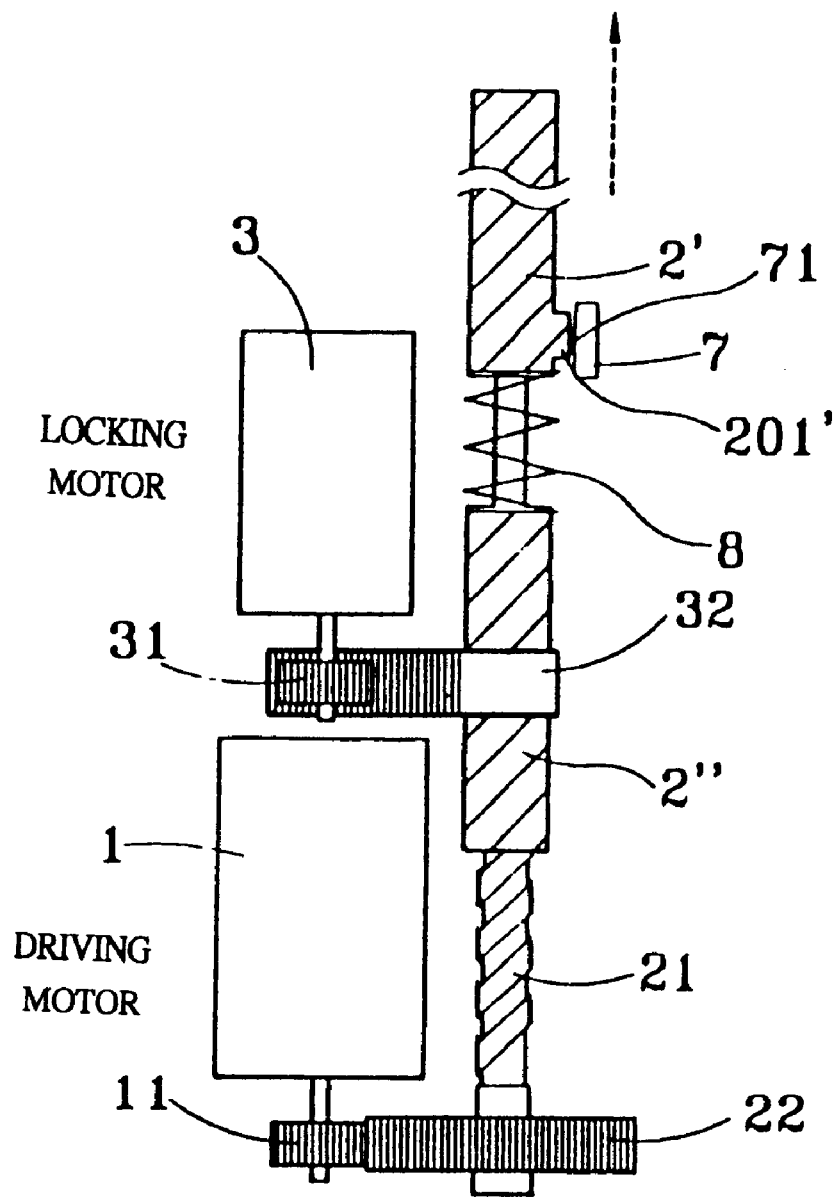
FIG. 10 is a sectional view of warning device in FIG. 9.

FIGS. 9 and 10 show another preferred embodiment of the present invention, the driven shaft comprises two pivotally connected shafts 2' and 2" and an elastic member 8 is provided between the two shafts 2' and 2". When the shaft 2' is driven, a bump 201' outside the shaft 2' touches the button 71 of the micro-actuated switch 7 and the micro-actuated switch 7 generates an alarm signal. Moreover, in this embodiment, the micro-actuated switch 7 can be replaced by optoelectronic or magnetic switch.

The present invention is characterized in that a triggering space is left after the locking shaft 32 passes the through hole to provide a region for generating warning signal. When the puller is pulled by external force, sensor 41 in the triggering space is triggered. However, the length of the triggering space is smaller than the unlocking length of the door lock.

Moreover, the alarm means 4 can be a high-voltage shocking means rather then a loud speaker 44 to prevent noise and to provide chance to catch the thief.

The triggering space can be formed by drilling a hole in the puller or other means by which the puller will trigger an alarm before being puller to a door opening position.

Moreover, the triggering space can be formed on any linking element of the door rather than the driven shaft 2 as long as the door has sufficient space to accommodate the triggering space.

Although the present invention has been described with reference to the preferred embodiment thereof, it will be understood that the invention is not limited to the details thereof. Various substitutions and modifications have suggested in the foregoing description, and other will occur to those of ordinary skill in the art, Therefore, all such substitutions and modifications are intended to be embraced within the scope of the invention as defined in the appended claims.

What is claimed is:

1. A door locking system for a vehicle including an alarm and comprising:
   a) a first elongated locking shaft having a transverse through hole;
   b) a first motor drivingly connected to the elongated locking shaft so as to move the elongated locking shaft in a longitudinal direction;
   c) a second locking shaft, the second locking shaft being movable so as to extend into the through hole of the first, elongated, locking shaft, a height dimension of the second locking shaft being less than a corresponding dimension of the through hole such that, when the second locking shaft extends into the through hole, a triggering space is formed between the second locking shaft and a side of the through hole;
   d) a second motor drivingly connected to the second locking shaft so as to move the second locking shaft;
   e) an alarm system including a control integrated circuit (IC) connected to a driving circuit which is, in turn, connected to a speaker; and,
   f) a sensor located in the triggering space and connected to the control IC whereby, when the second locking shaft is engaged with the through hole, movement of the first locking shaft relative to the second locking shaft, indicative of an unauthorized attempt to unlock the vehicle, causes the sensor to generate a signal to the control IC and activate the alarm system.

2. The door locking system of claim 1 wherein the sensor comprises:
   a) a first metal plate on the side of the through hole;
   b) a second metal plate on the second locking shaft; and,
   c) a returning element in contact with and extending from one of the first and second metal plates, the returning element contacting the other of the first and second metal plates only when the first locking shaft is moved relative to the second locking shaft.

3. The door locking system of claim 1 wherein the sensor comprises a micro-switch.

4. The door locking system of claim 1 further comprising:
   a) a worm connected to an end of the first, elongated locking shaft; and,
   b) a driven gear connected to the worm and driven by the first motor.

5. The door locking system of claim 4 further comprising a second driven gear driven by the second motor and engaging the second locking shaft.

* * * * *